United States Patent
Avins et al.

(10) Patent No.: US 8,442,990 B1
(45) Date of Patent: May 14, 2013

(54) QUERY-BASED EVENT ROUTING

(75) Inventors: Jamie Avins, Foster City, CA (US); Tommy Maintz, Haarlem (NL)

(73) Assignee: Sencha, Inc., Redwood City, CA (US)

( * ) Notice: Subject to any disclaimer, the term of this patent is extended or adjusted under 35 U.S.C. 154(b) by 0 days.

(21) Appl. No.: 13/301,220

(22) Filed: Nov. 21, 2011

Related U.S. Application Data

(60) Provisional application No. 61/498,507, filed on Jun. 17, 2011.

(51) Int. Cl.
*G06F 7/00* (2006.01)
*G06F 17/30* (2006.01)

(52) U.S. Cl.
USPC ............ 707/758; 719/310; 719/318; 719/320

(58) Field of Classification Search .................... 707/758
See application file for complete search history.

(56) References Cited

U.S. PATENT DOCUMENTS

| | | | |
|---|---|---|---|
| 6,708,162 B1 * | 3/2004 | Morgan et al. ........................ | 1/1 |
| 6,744,447 B2 | 6/2004 | Estrada et al. | |
| 2002/0140730 A1 | 10/2002 | Linsey et al. | |
| 2002/0152234 A1 | 10/2002 | Estrada et al. | |
| 2002/0154172 A1 | 10/2002 | Linsey et al. | |
| 2002/0156808 A1 | 10/2002 | Duffy et al. | |
| 2002/0194388 A1 * | 12/2002 | Boloker et al. ............... | 709/310 |
| 2003/0014485 A1 | 1/2003 | Banatwala | |
| 2003/0028562 A1 | 2/2003 | Shaughnessy et al. | |
| 2004/0205644 A1 | 10/2004 | Shaughnessy et al. | |
| 2004/0216134 A1 * | 10/2004 | Hammerich et al. ......... | 719/318 |
| 2006/0100881 A1 * | 5/2006 | He ................. | 704/270 |
| 2007/0016869 A1 * | 1/2007 | Mukundan et al. ........... | 715/744 |
| 2007/0067418 A1 * | 3/2007 | Isaacs et al. .................. | 709/219 |
| 2007/0288501 A1 | 12/2007 | Estrada et al. | |
| 2008/0250429 A1 * | 10/2008 | Lockhart et al. .............. | 719/320 |
| 2009/0106296 A1 | 4/2009 | Sickmiller et al. | |
| 2011/0197124 A1 | 8/2011 | Garaventa | |
| 2012/0005429 A1 | 1/2012 | Kalasapur et al. | |

OTHER PUBLICATIONS

"Cascading Style Sheets Level 2 Revision 1 (CSS2.1) Specification", Jul. 6, 2011.*
WC3, "Cascading Style Sheets Level 2 Revision 1 (CSS 2.1) Specification", Dated Jun. 7, 2011, 42 pages.

* cited by examiner

*Primary Examiner* — Binh V Ho
(74) *Attorney, Agent, or Firm* — Hickman Palermo Truong Becker Bingham Wong LLP; Adam C. Stone

(57) ABSTRACT

Techniques are described herein to allow a query and one or more associated actions to be registered as an "event selector", and to have the one or more actions of the event selector invoked when an event occurs on a target that matches the query. According to one aspect, a selector string representing the query and one or more actions associated with the selector string are obtained. In response to obtaining an event, a target of the event is obtained and it is determined whether the target matches the selector string. If the target matches the selector string, then the one or more actions associated with the selector string are invoked. By doing so, events may be indirectly routed to actions through queries on event targets.

10 Claims, 7 Drawing Sheets

QUERY-BASED EVENT ROUTING

PRIORITY CLAIM

This application claims the benefit of Provisional Appln. 61/498,507, filed Jun. 17, 2011, the entire contents of which is hereby incorporated by reference as if fully set forth herein, under 35 U.S.C. §119(e).

TECHNICAL FIELD

Embodiments relate generally to event routing in computing systems and, more particularly to query-based event routing.

BACKGROUND

Modern event-driven software applications, such as many client-side web applications, can be hard to write, hard to organize and hard to maintain. The software code for such applications tends to quickly grow out of control as application developers add more functionality and developers to a project. The code for routing and handling events is notoriously difficult to develop and maintain, especially where there are many different types of events and many different actions to be taken in response to events. To make it easier to develop and maintain event routing and handling code of an application, developers often agree on an event routing and handling framework. Unfortunately, current frameworks are inadequate for some software applications, especially for applications where the software codebase undergoes frequent change by multiple developers.

In general, the task of an event routing and handling framework is to route runtime events that occur during execution of the application to actions to be performed in response to the events. For example, an event routing and handling framework may be used to route a "click" event on a particular graphical user interface button to a certain action to be performed when a user clicks on that button.

According to a "direct" event routing and handling framework, events are mapped directly to the actions to be taken. This framework is used in some client-side web applications, for example. There, Uniform Resource Locators (URLs) corresponding to user interface events (e.g., a click of a button) are typically directly mapped to event handlers. When a user interface event occurs, the URL corresponding to the event is used to determine the event handler to invoke. However, the direct event routing and handling framework can result in a brittle and inflexible codebase. For example, if the codebase is modified to generate a new event for which a particular action is to be taken (e.g., a new button is added), then the codebase may need to be additionally modified to map the new event to an event handler. If such mapping is neglected, for example because of developer non-communication, then occurrence of the new event during execution of the application may cause a defect to manifest. Further, since events are directly tied to event handlers through a URL-to-action mapping, seemingly unrelated codebase changes can break the mapping. For example, a developer may change a URL associated with a particular event for cosmetic reasons or some other reason unrelated to event routing and handling thereby causing the particular event to no longer be properly handled when the particular event occurs.

Based on the foregoing, it is clearly desirable to provide a framework for routing events in software applications that avoids the code development issues of direct event routing and handling frameworks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF AN EMBODIMENT

Techniques are described herein to allow a query and one or more associated actions to be registered as an "event selector", and to have the one or more actions of the event selector invoked when an event occurs on a target that matches the query. According to one aspect, a selector string representing the query and one or more actions associated with the selector string are obtained. In response to obtaining an event, a target of the event is obtained and it is determined whether the target matches the selector string. If the target matches the selector string, then the one or more actions associated with the selector string are then invoked. By doing so, events may be indirectly routed to actions through queries on event targets.

Certain embodiments have other aspects in addition to or in place of those mentioned above. The aspects will become apparent to those skilled in the art from a reading of the following description when taken with reference to the accompanying drawings.\

DETAILED DESCRIPTION OF EMBODIMENTS

Figure 1:
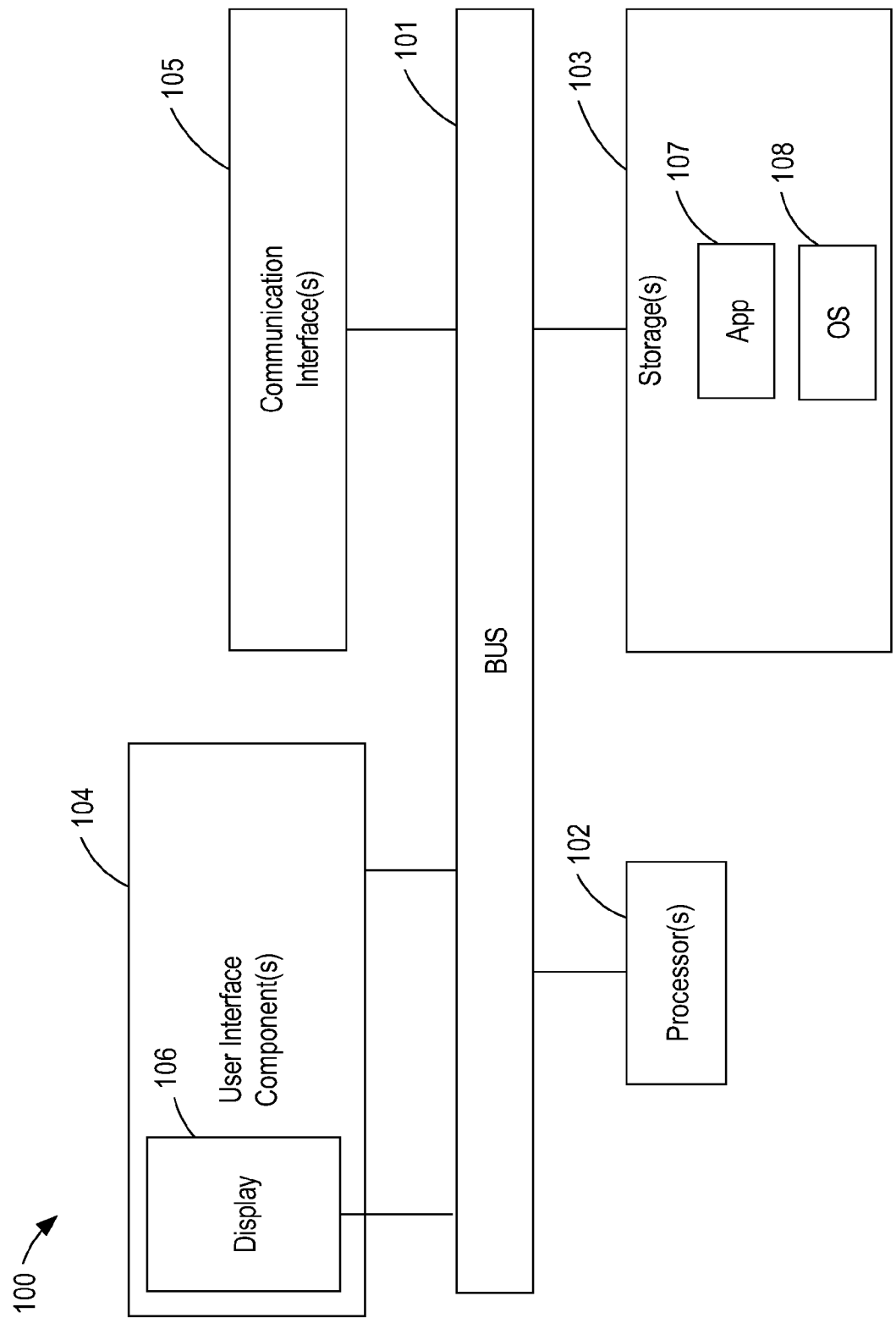
FIG. 1 is a block diagram of a sample computing device on which some embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview: Query-Based Event Routing

Query-based event routing is an event routing and handling framework by which an application can register interest in certain events with a "query" on targets of the events and have one or more actions associated with the query invoked when events occur on targets that match the query. Usually, these queries represent conditions on targets of events of interest (e.g., all click events on all buttons on a particular panel). The invocation of the action(s) associated with the query would then represent the fact that an event of interest for the application has occurred. Techniques are described herein to allow a query and one or more associated actions to be registered as an "event selector", and to have the one or more actions of the event selector invoked when an event occurs on a target that matches the query. In some embodiments, these techniques are implemented in a Javascript-based client-side web application—in order to route and handle user interface events and/or internal application events.

As shall be described in greater detail hereinafter, event selectors are registered with an event router. In some embodiments, the registration includes: (a) a selector string representing the query on event targets and (b) data representing, indicating, or specifying one or more actions for the event router to invoke or take upon satisfaction of the selector string by an event target.

In some embodiments, the registration additionally includes (c) a specification of an event type to indicate that (b) the action(s) of the registered event selector are to be invoked or taken only if the type of the event matches (c) the specified event type.

In some embodiments, event selector registration is combined with application initialization so that the event router is configured to route events by the time a first event is generated. As an example, a controller object of a Model-View-Controller (MVC)-based software application during the time of controller object instantiation or initialization may register one or more event selectors on one or more views.

In some embodiments, when registering an event selector, one or more of the actions of the event selector are callbacks to the registering entity or component. For example, the callback could be an instance method of the controller object.

By routing events to actions indirectly by way of registered queries on event targets, the potential for application codebase changes to cause unintended defects can be reduced. For example, assume a developer of a graphical user interface application desires for a particular action to be taken any time a panel is the target of a "render" event. In accordance with some embodiments of the inventive techniques disclosed herein, the developer can code the application to register an event selector with the overall runtime effect that any time a "render" event "fires" on a panel the particular action is taken. If the application codebase is subsequently modified to add a new panel, the codebase need not also be modified to ensure that the particular action is taken when the "render" event fires on the new panel. Instead, the previously registered event selector ensures this by matching any "render" event that fires on any panel. This is just one example of a possible benefit of the query-based event routing framework disclosed herein and other benefits will be apparent from the following description.

Sample Computing Device

With reference to FIG. 1, there is shown a block diagram of a sample computing device 100 in which some embodiments of the present invention may be implemented. As shown, device 100 includes a bus 101 for facilitating information exchange, and one or more processors 102 coupled to bus 101 for executing instructions and processing information. Device 100 also includes one or more storages 103 (also referred to herein as non-transitory computer-readable media) coupled to the bus 101. Storage(s) 103 may be used to store executable programs, permanent data, temporary data that is generated during program execution, and any other information needed to carry out computer processing.

Storage(s) 103 may include any and all types of storages that may be used to carry out computer processing. For example, storage(s) 103 may include main memory (e.g. random access memory (RAM) or other dynamic storage device), cache memory, read only memory (ROM), permanent storage (e.g. one or more magnetic disks or optical disks, flash storage, etc.), as well as other types of storage. The various storages 103 may be volatile or non-volatile. Common forms of non-transitory computer-readable media include, for example, a floppy disk, a flexible disk, hard disk, magnetic tape, or any other magnetic medium, a CD-ROM, DVD, or any other optical storage medium, a RAM, a PROM, an EPROM, a FLASH-EPROM or any other type of flash memory, any memory chip or cartridge, and any other storage medium from which a computer can read.

As shown in FIG. 1, storage(s) 103 store at least several sets of executable instructions, including an operating system 108 and an application 107. The processor(s) 102 execute the operating system 108 to provide a platform on which other sets of software may operate, and execute the application 107 to provide additional, specific functionality. For purposes of the present invention, the application 107 may be any type of event-driven application that receives or generates events that need to be handled or processed.

In some embodiments, the query-based event routing functionality described herein is performed by the application 107 to route and handle events within the application 107. Thus, when the application 107 receives or generates an event, the event is routed by the application 107 to one or more actions which are then executed by the application 107 itself. As an alternative, the operating system 108 may perform some the query-based event routing functionality as a service to the application 107. For example, the application 107 may register event selectors with the operating system 108 and when events of interest occur within the operating system 108, the operating system 108 may callback into the application 107. As a further alternative, the query-based event routing functionality may be provided by a combination of or cooperation between the operating system 108, the application 107, and one or more other applications (not shown) executing on the device 100. All such possible divisions of functionality are within the scope of the present invention.

The device 100 further comprises one or more user interface components 104 coupled to the bus 101. These components 104 enable the device 100 to receive input from and provide output to a user. On the input side, the user interface components 104 may include, for example, a keyboard/keypad having alphanumeric keys, a cursor control device (e.g. mouse, trackball, touchpad, etc.), a touch sensitive screen, a microphone for receiving audio input, etc. On the output side, the components 104 may include a graphical interface (e.g. a graphics card) and an audio interface (e.g. sound card) for providing visual and audio content. The user interface components 104 may further include a display 106, a set of speakers, etc., for presenting the audio and visual content to a user. In some embodiments, the operating system 108 and the application 107 executed by the processor(s) 102 may provide a software user interface that takes advantage of and interacts with the user interface components 104 to receive input from and provide output to a user. This software user interface may, for example, provide a menu that the user can navigate using one of the user input devices mentioned above.

In addition to the components set forth above, the device 100 further comprises one or more communication interfaces 105 coupled to the bus 102. These interfaces 105 enable the device 100 to communicate with other components. The communication interfaces 105 may include, for example, a network interface (wired or wireless) for enabling the device 100 to send messages to and receive messages from a network. The communications interfaces 105 may further include a wireless interface (e.g. Bluetooth) for communicating wirelessly with nearby devices, and a wired interface for direct coupling with a compatible local device. Furthermore, the communications interfaces 105 may include a 3G interface, a 4G interface, or the like for enabling the device to access the Internet without using a local network. These and other interfaces may be included in the device 100.

Exemplary Application Runtime Components

Figure 2:
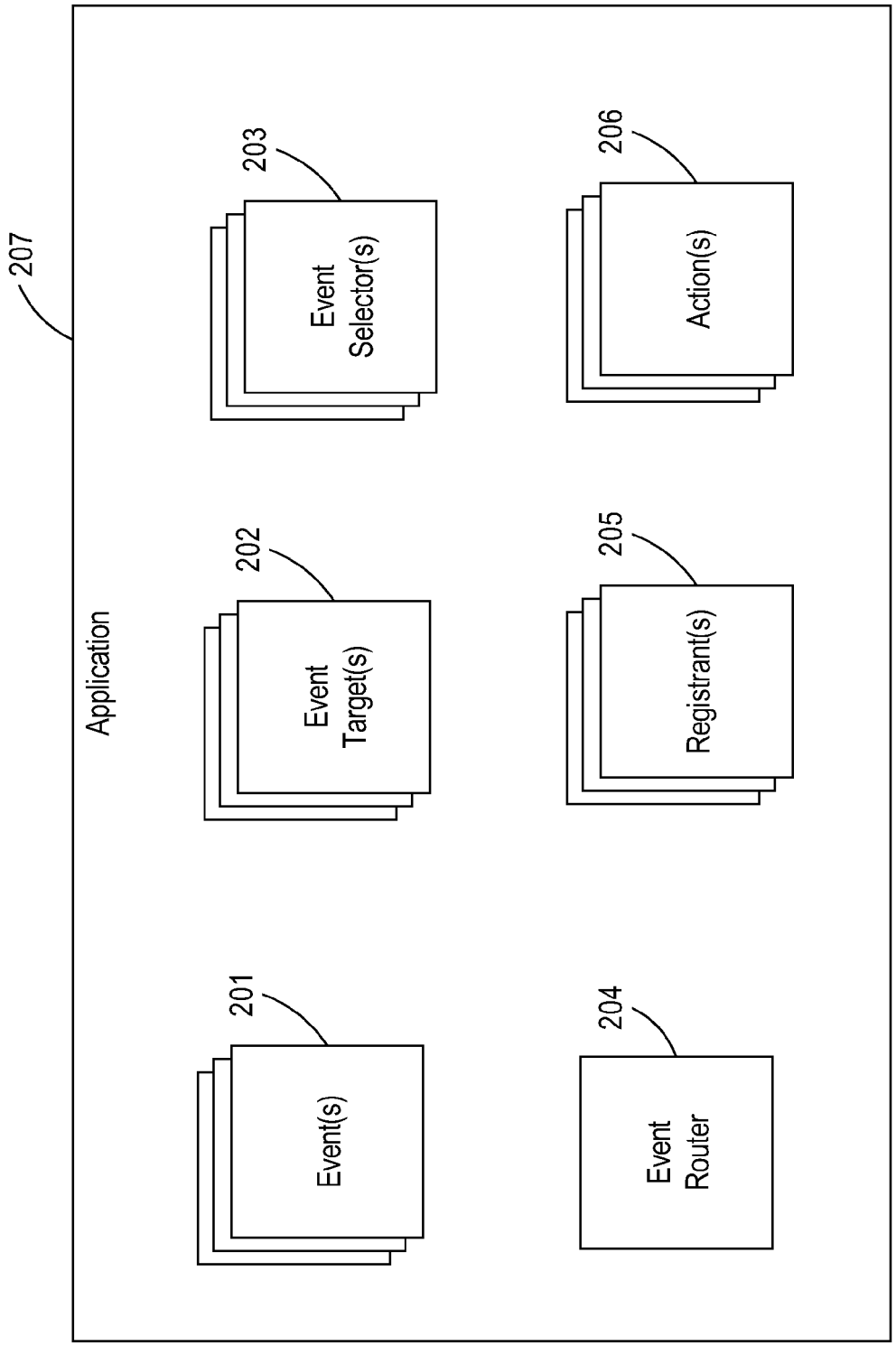
FIG. 2 is a block diagram of exemplary runtime components of an application implementing query-based event routing according to some embodiments of the invention.

With reference to FIG. 2, there is shown a block diagram of exemplary runtime components 201-206 of an application 207 implementing query-based event routing according to some embodiments of the invention. The application 207 may be made up of one or more sets of executable instructions executable by a computing device such as, for example, device 100 of FIG. 1. The application 207 may be developed using any number of different types of programming languages including, as non-limiting examples, C, Scheme, Java, Perl, Python, Self, Javascript, CoffeeScript, Jscript, Jscript .NET, Objective-J, TlScript, etc.

During execution, the application 207 creates, instantiates, or generates runtime components 201-206 in a computer memory (e.g., storage 103). Also during execution, the runtime components 201-206 may interact with each other through one or more of message passing, function calls, inter-process communication, remote-procedure calls, etc. Each runtime component 201-206 may be viewed generally as a collection of data and logic that operates on that data. More specifically, the runtime components 201-206 may be viewed as the building blocks for implementing query-based event routing. It will be understood that these, and other associated building blocks and components, may be configured as standalone elements or combined into one or more assemblies, as needed or appropriate for the particular implementation at hand.

As shown in FIG. 2, the runtime components 201-206 include one or more events 201, one or more event targets 202, one or more event selectors 203, an event router 204, one or more registrants 205, and one or more actions 206. It will be understood that the names given to runtime components 201-206 is somewhat arbitrary and identical or equivalent runtime components in other implementations may use different names.

Sample Event

During execution, the application 207 receives or generates one or more events 201. An event 201 may be associated with an event type (e.g., click, load, error, etc.) that reflects, indicates, or specifies the type of the event that occurred. An event 201 may also be associated with an event target 202 (e.g., button, data object, etc.) that is the target or subject of the event 201.

In one respect, an event 201 may be viewed as a message to the application 207 indicating that something has happened (e.g., keyboard stroke, mouse click, etc.) either outside the application 207 or within the application 207. The source of an event 201 can be a user of the application 207 such as, for example, when the user interacts with a user interface of the application 207 by, for example, clicking a button on the user interface, resizing a window, entering text, etc. The source of an event 201 can be a software-based or hardware-based timer that causes an event 201 to be "fired". The source of an event 201 can be a component of the application 207 itself. In other words, an event 201 can be an internally generated event. These are but some examples of the types of sources of events 201 and other sources are possible. Thus, it should be understood that embodiments are not limited to only one type of event source such as, for example, a user interacting with a user interface.

An event 201 may "wrap" another event generated by a component or module external to the application 207. For example, an event 201 may encapsulate or contain a Document Object Model (DOM) event fired or generated by a DOM of a web browser application. As another example, an event 201 may reference a database event generated by a database application or contain, reference, or encapsulate a Remote Procedure Call (RPC) message received from a network peer of the application 207.

An event 201 may be handled by the event router 204 before the event 201 is routed to one or more actions 206.

In some embodiments, upon obtaining an event 201, the event router 204 consults a set of one or more previously registered event selectors 203 (registered by registrant(s) 205) to determine if any of registered event selectors 203 match the event target 202 associated with the event 201. In particular, for a given event selector 203 of the set of registered event selectors 203, the event router 204 determines if the selector string of the event selector 203 matches the event target 202 associated with the event 201. If so, then the event router 204 invokes or initiates the one or more actions 206 of the event selector 203. The event router 205 may repeat this process for the obtained event 201 and other registered event selectors 203.

In some embodiments, upon obtaining an event 201, the event router 204 first determines the type of the event 201. This determined type is then used by the event router 204 to determine a set of registered event selectors 203 registered under that event type (which may be a subset of all event selectors 203 registered with the event router 204). For each event selector 203 of the set, the event router 204 determines if the selector string of the event selector 203 matches the event target 202 associated with the obtained event 201. If so, then the event router 204 invokes or initiates the one or more actions 206 of the event selector 203.

Figure 3:
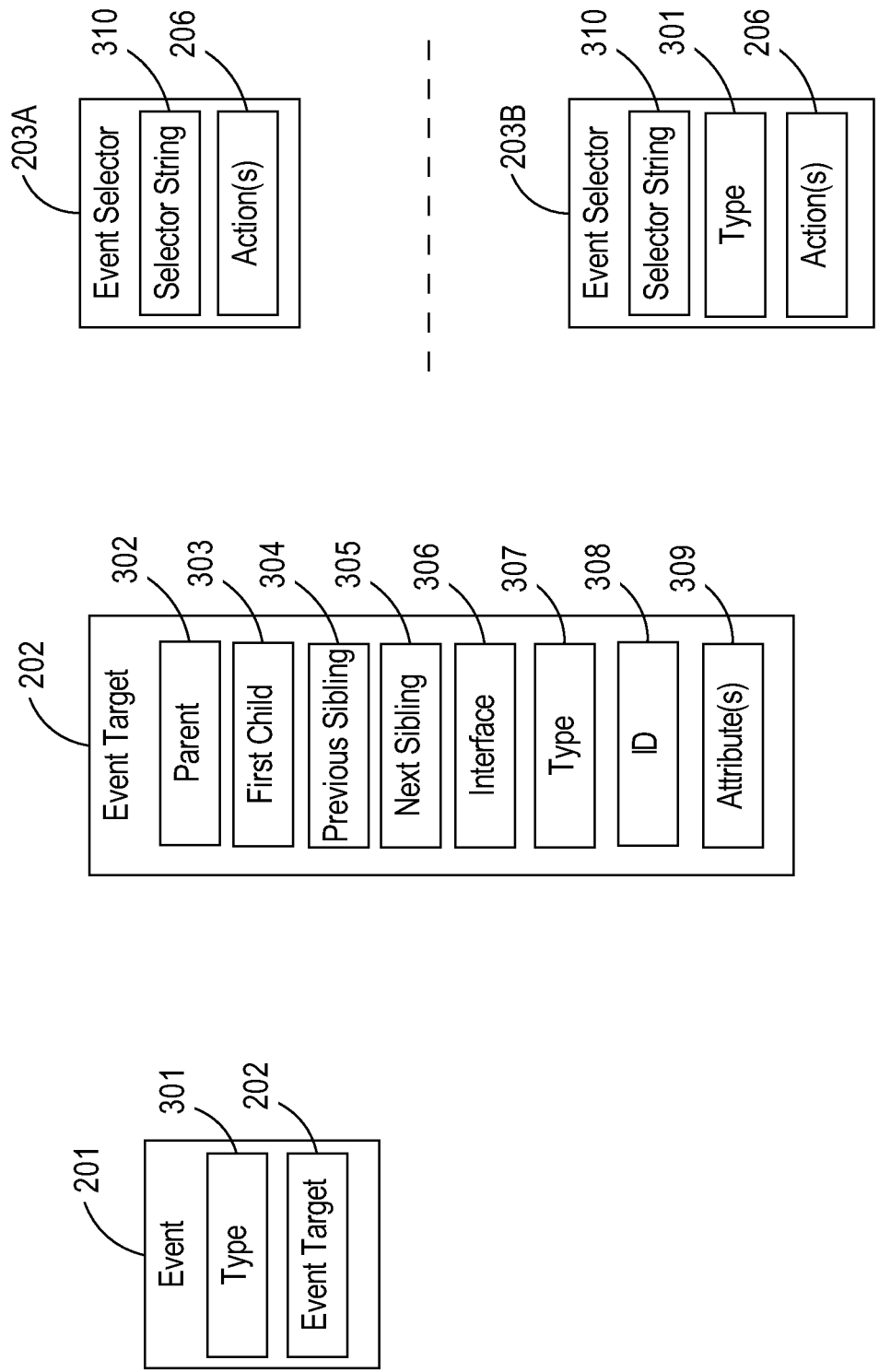
FIG. 3 is a block diagram of a sample event, an exemplary event target, and a sample event selector according to some embodiments of the invention.

Turning now to FIG. 3 which illustrates runtime components 201-203 in greater detail according to some embodiments, as a message indicating that something has happened, an event 201 may contain or reference an indication of the type 301 of the event that occurred. For example, an event 201 may have an instance attribute or property whose value indicates the type 301 of the event 201. Alternatively, an event 201 may reference or point to a data object that indicates the type 301 of the event 201. As another alternative, the data type or class of the event 201 itself may be the type 301 of the event 201. For the purpose of providing clear examples, the type 301 of an event 201 will sometimes be referred to herein using double quotes as in, for example: "click", "dblclick", "mouseover", "keydown", "load", "focus", "render", etc. However, it should be understood an event type 301 can be represented by a data type other than string or byte character sequence such as, for example, an enumeration, a number, a complex data type, an object-oriented class, a prototype, etc.

Exemplary Event Target

In addition to containing or referencing an event type 301, an event 201 may also contain or reference an event target 202 as part of the message that is the event 201. The event target 202 of an event 201 may be viewed generally as the subject of the thing that happened that is reflected by the event 201. For example, the event target 202 may be a user-interface component to which user interface interaction was directed to or affected by. As another non-limiting example, the event target 202 may be database record that was changed in a database. Typically, the event target 202 will be an instance of a particular class or data type that contains or encapsulates data and logic. The event target 202 may have a specific programmatic interface by which other components of the application 207 may gain access to the data and logic. For example, assume application 207 is a user interface application, when a user clicks on a particular button of the user interface, an event 201 may be generated of event type 301 "click" that references (or points to) the instance of a "button" class corresponding to the particular user-interface button. Thus, while an event 201 may have a type 301 (e.g., "click"), the event target 202 associated with the event 201 may be of a type (e.g., "button"). For the purpose of providing clear examples, the type of an event target 202 will sometimes be referred to herein using double quotes as in, for example: "button", "panel", "window", etc. However, it should be understood that the type of an event target 202 can be represented by a data type other than string or byte character sequence such as, for example, an enumeration, a number, a complex data type, an object-oriented class, a prototype, etc.

An event 201 may reference the event target 202 of the event 201 through, for example, an object reference or data pointer (address) to the event target 202. Alternatively, the event 201 may reference an event target 202 through an identifier of the event target 202 which may be used to lookup the event target 202 in a data structure (e.g., hash table, associative array, tree, etc.) that associates identifiers to event targets 202.

An event target 202 of an event 201 may be involved in a parent-child relationship with other components of the application 207 which may also be event targets 202 of other events 201. For example, a "button" event target 202 may reference the parent "panel" on which the "button" is rendered which in turn may reference the parent "window" on which the "panel" is rendered. Similarly, the "window" may reference the child components that are rendered on the "window" including the "panel" and, the "panel", in turn, may reference the child components that are rendered on the panel including the "button". Thus, a given event target 202 may have a parent component, zero or more child components, and zero or more sibling components. Further, a given event target 202 may have a number of descendant components which include the children component(s) of the event target 202, their children, their children's children, etc. For example, the "window" has as descendants the "panel" and the "button", and the "panel" has the "button" as a descendant.

In some embodiments, an event target 202 contained or referenced in an event 201 provides a programmatic interface through which a reference to the event target's 202 parent component, if any, may be obtained and reference(s) to the event target's 202 child component or children component may be obtained. A component obtained through this interface may provide the same, similar, or functionality equivalent interface for obtaining references to the obtained component's parent and/or the component's children, and so on. Thus, in some embodiments, a given event target 202 contained or referenced in an event 201 may be viewed as being part of a tree of components where the event target 202 is either the root component of the tree (i.e., has at least one child component), an intermediary component of the tree (i.e., has both a parent component and at least one child component), or a leaf component of the tree (i.e., only has a parent component).

In some embodiments as depicted in FIG. 3, an event target 202 has a reference 302 to its parent component, if any. If the event target 202 does not have a parent, then the reference 302 may be "null" or other empty value. Further, the event target 202 may have a reference 303 to its first child, if any. Still further, the event target 202 may have a references 304 and 305 to its previous sibling, if not the first child of its parent component, and its next sibling, if not the last child of its parent component. Thus, the children of an event target 202 or component may be ordered (e.g., first child, second child, third child, . . . last child).

In some embodiments, an event target 202 contained or referenced in an event 201 provides a programmatic interface 306. In some embodiments, the interface 106 accepts as input a selector string of an event selector 203. As output, the interface 306 provides a boolean value (e.g., true/false) specifying whether the event target 202 matches the input selector string.

In some embodiments, the interface 306 provides a programmatic manner by which the event router 205 can interrogate the event target 202 to determine whether a selector string of a given event selector 203 matches the event target 202. The interface 306 may, for example, be implemented as one or more methods, functions, or procedures of the event target 202 that can be called or invoked by other components of the application 207.

In some embodiments, an event target 202 has a type 307 which may, for example, correspond to the event target's 202 data type, class or class name, prototype or prototype name, etc. For the purpose of providing clear examples, the type of an event target 202 will sometimes be referred to herein using double quotes as in, for example: "button", "panel", "window", etc. However, it should be understood that the type 307 of an event target 202 can be represented by a data type other than string or byte character sequence such as, for example, an enumeration, a number, a complex data type, an object-oriented class, a prototype, etc.

In some embodiments, an event target 202 has an identifier 308 which uniquely identifies the event target 202 among a set of components of the application 207. The identifier 308 may, for example, be a number, a character-numeric byte sequence, a UID, a GUID, etc.

In some embodiments, an event target 202 has one or more attributes 309 which may, for example, correspond to properties of the event target 202. Each attribute 309 may have a corresponding value or values. Each attribute 309 may be of a particular data type, class type, prototype, etc. The number and types of attributes 309 of a given event target 202 may vary depending of the type 307 of the event target 202. For example, an event target 202 of type 307 "button" may have an "action" attribute 309 with a value of "save".

Sample Event Selectors

As indicated previously, events 201 may be mapped to actions 206 based on registered event selectors 203. In some embodiments, an event selector 203 includes a selector 310 string and data representing one or more actions 206 to take when the event selector 203 matches an event target 202.

In one respect, the selector string 310 may be viewed as a query that is executed on event targets 202 as events 201 occur in the application 207. If the query, when executed on a particular event target 202, is satisfied by the particular event target 202, then it can be said that the particular event 201 has been "selected" by the selector string 310. In another respect, the selector string 310 may be viewed as a predicate specifying one or more conditions that are evaluated against event targets 202 as events 201 occur. In this respect, if a particular event target 202 of a particular event 201 satisfies all of the conditions, then it can also be said that the particular event 201 has been "selected" by the selector string 310 of the event selector 203.

As described in greater detail below, one or more registrants 205 of the application 207 register during execution one or more event selectors 203 with the event router 204. In FIG. 3, two different types of event selectors 203A and 203B corresponding to two different event routing schemes are shown. According to the first scheme corresponding to event selector 203A, the event router 204 evaluates each obtained event 201 against all of a set of registered event selectors 203A to determine whether any of the registered event selectors 203A match the event 201. In the second routing scheme corresponding to event selector 203B, the event router 204 first determines the type 301 of the event 201. This determined event type 301 is then used by the event router 204 to determine a set of registered event selectors 203B registered under that event type 301. The event router 204 then evaluates the obtained event 201 against all registered event selectors 203B in that set.

In this description and in the drawings, where a feature or function applies to both types of event selectors, both types will be referred to singularly as event selector 203 (without the trailing "A" or "B"). Where a specific feature or function applies to one type of event selector and not the other, then the type of event selector to which the specific feature or function applies will be explicitly indicated as in event selector 203A or event selector 203B as appropriate.

When selected, the one or more action(s) 206 of the event selector 203 may be taken or invoked. In this way, events 201 may be indirectly routed to action(s) 206 through queries on event targets 202 thereby providing a more flexible framework for routing events to actions within an application that can reduce the potential for unintended application defects resulting from application codebase changes. In contrast, a framework that directly maps events 201 to actions 206, for example through direct event-to-action mappings, may be more rigid and less flexible in the face of codebase changes.

Exemplary Registrant

A registrant 205 is any component of the application 207 that registers interest in events 201 using one or more event selectors 203. In particular, a registrant 205 may create an instance of an event selector 203, specifying a selector string 310 and data representing the one or more actions 206 to take upon satisfaction of the selector string 310 by an event target 202. Once created, the registrant 205 may pass the created event selector 203 instance to the event router 204. The event router 204 may then use the registered event selector 203 upon obtaining events 201.

In some embodiments in which the application 207 is architected according to a Model-View-Controller (MVC) software architecture, a controller or controllers of the MVC architecture may also each be a registrant 205. In this case, a controller may register interest in events on views (e.g., buttons, panels, etc.) using event selectors 203. An example Javascript-based MVC architecture using event selectors 203 is described below.

Sample Event Router Operation

Figure 4:
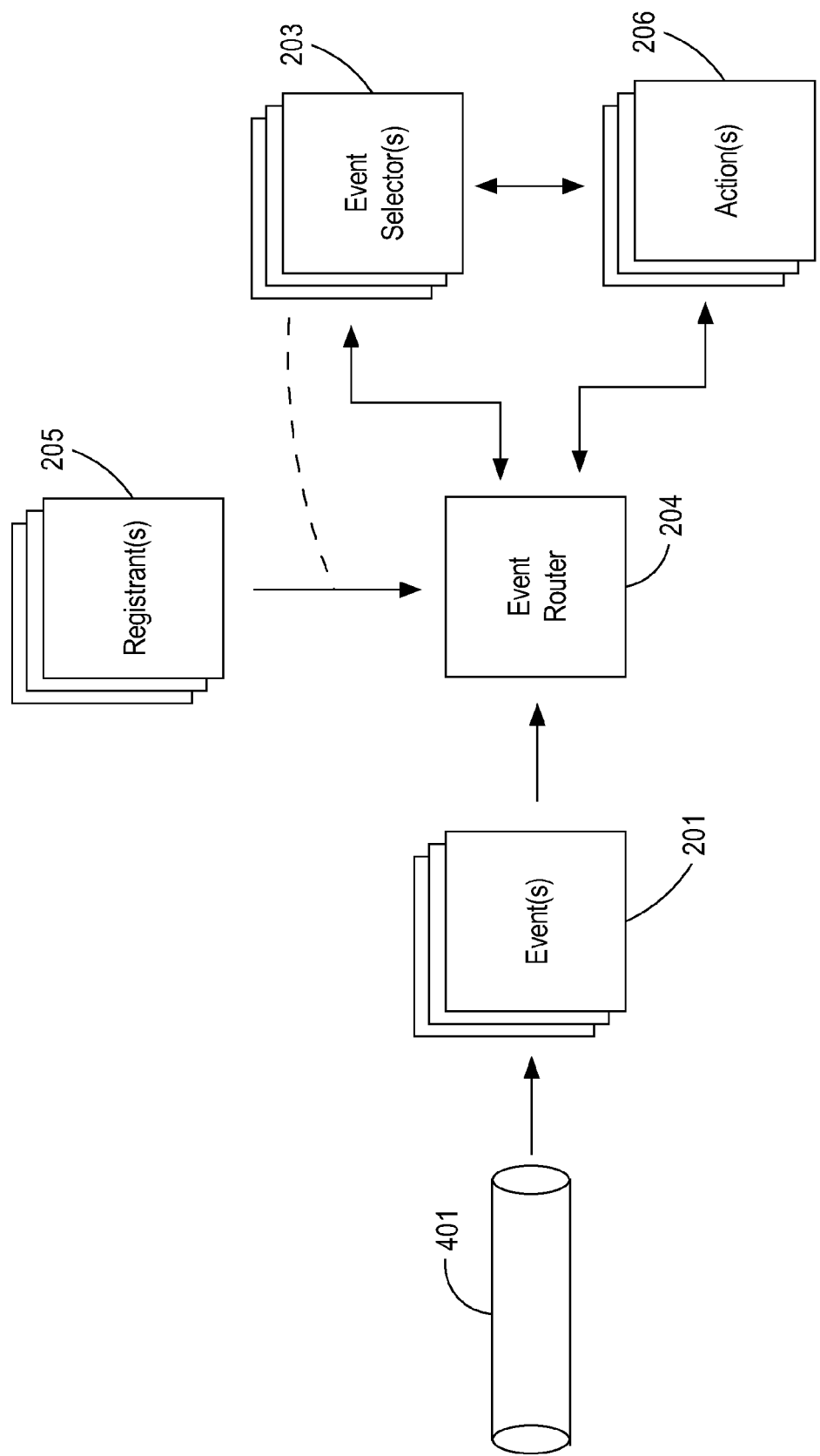
FIG. 4 is a block diagram of a sample event router operation according to some embodiments of the invention.

Turning now to FIG. 4, there is shown a sample operation of an event router 204 according to some embodiments of the invention. Initially, one or more registrants 205 register one or more event selectors 203 with the event router 204. As mentioned, each registered event selector 203 includes data that represents one or more actions 206 to take when the event selector 203 is matched by an event 201.

In operation, the event router 204 may obtain events 201 from an event queue 401. Events 201 may be added to the queue 401 as they are generated or received by the application 207. When processing events 201 from the queue 401, the event router 204 may, for example, always obtain the event 201 at the head (beginning) of the queue 401, process that event 201, and then process the next event 201 waiting at the head of the queue 401 to be processed. This process may, for example, be repeated in a loop for the life of the executing application 207. Events 201 may be re-ordered in the queue 204 according to an event priority scheme by a separate event ordering mechanism of the application 207. Alternatively, the order of events 201 in the queue may reflect the order in time that the events 201 were received or generated by the application 207. Other ordering schemes are possible and embodiments are not limited to any particular ordering scheme.

While only one queue 401 is shown in FIG. 4, an application 207 may have many queues 401 from which the event router 204 processes events. Further, irrespective of whether the application 207 has multiple queues 401, the event router 204 may process multiple events 201 in parallel or concurrently, for example, in separate threads of execution.

Further, while only one event router 204 is shown in FIG. 4, an application 207 may have multiple event routers 204 each processing events 201 from different queues 401 or the same queue(s) 401.

As mentioned, the event router 204 may employ at least one of two different query-based event routing schemes: (1) routing events 201 to actions 206 based on the selector strings 310 of a set of registered event selector(s) 203A, and (2) routing events 201 to actions 206 based on the selector strings 310 and the event types 301 of registered event selector(s) 203B. These two routing schemes will now be described with reference to the flowcharts of FIGS. 5 and 6A/6B respectively. As to the flowcharts, each block within the flowcharts represents both a method step and an apparatus element for performing the method step. Depending upon the implementation, the corresponding apparatus element may be configured in hardware, software, firmware, or combinations thereof.

A First Exemplary Query-Based Event Routing Process

Figure 5:
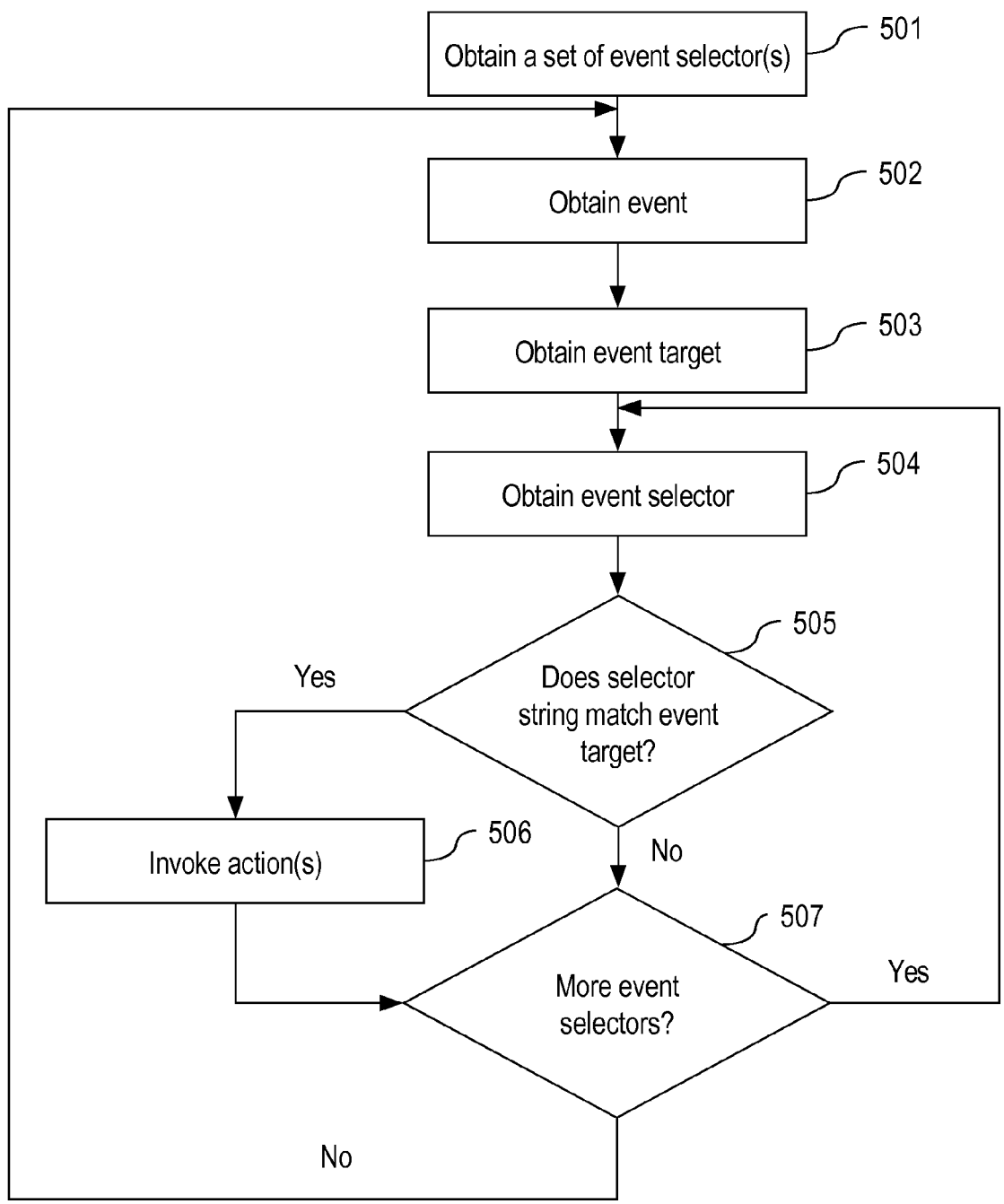
FIG. 5 is a flowchart of a first query-based event routing scheme according to some embodiments of the invention.
Figure 6A:
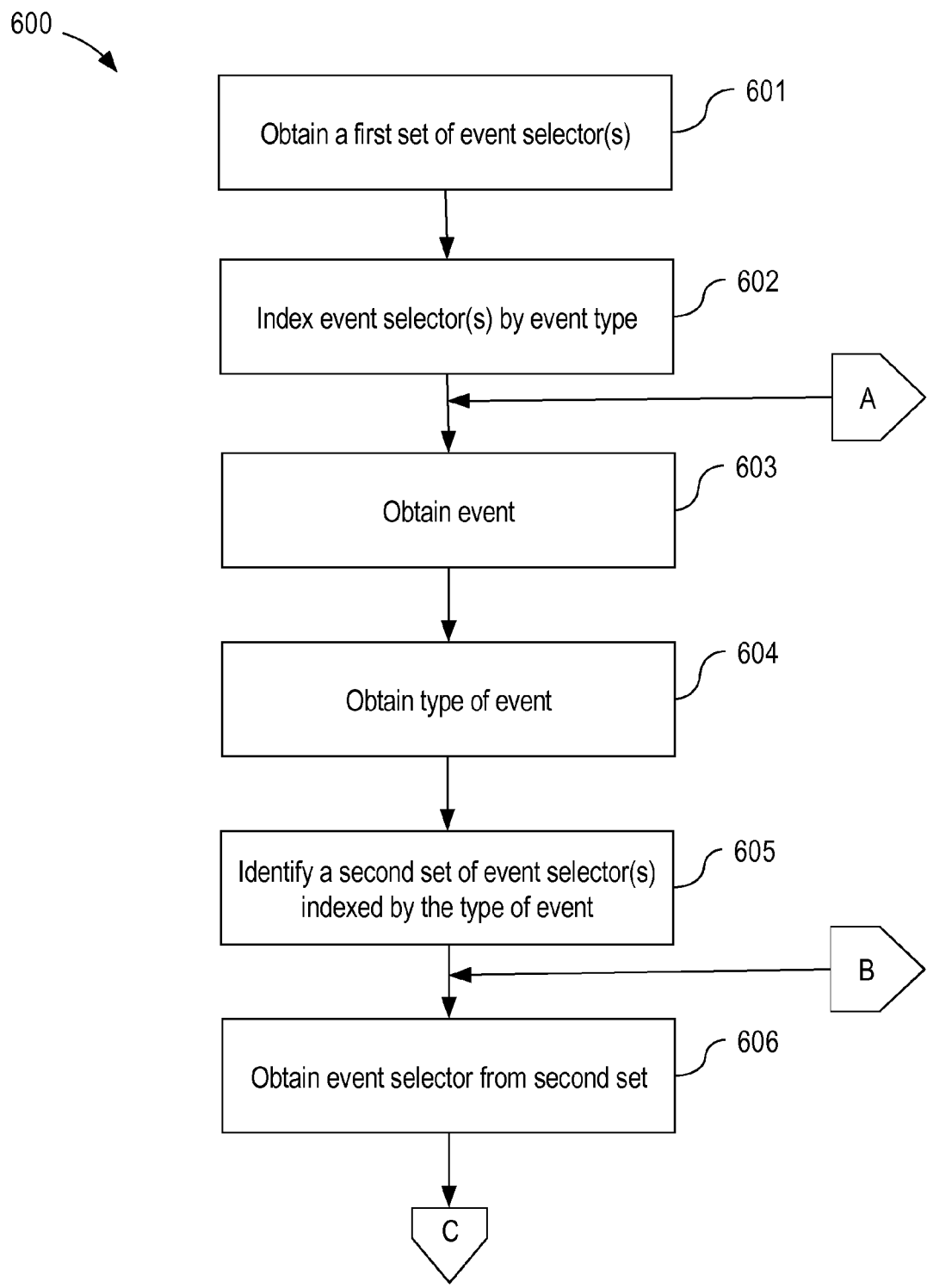
FIGS. 6A and 6B are a flowchart of a second query-based event routing scheme according to some embodiments of the invention.

Turning first to FIG. 5, there is shown a flowchart of a first query-based event routing process 500 in which events 201 are routed to actions 206 based on selector strings 310 of a set of registered event selector(s) 203A. Process 500 may be performed in the context of an executing application such as application 207. Initially, a set of event selector(s) 203A is obtained (block 501) by an event router 204 of the application 207. The event router 204 obtains the set of event selector(s) 203A from one or more registrants 205 of the application 207. Each event selector 203A in the set includes a selector string 310 and data representing one or more actions 206.

Next, the event router 204 obtains (block 502) an event 201. After obtaining the event 201, the event router 204 obtains (block 503) the event target 202 associated with the event 201. For example, the event router 204 may request a reference or handle to the event target 202 from the event 201 using a programmatic interface offered by the event 201.

At block 504, an event selector 203A is obtained (block 504) from the set of registered event selectors 203A. The event router 204 then determines (block 505) whether the event target 202 of the current event 201 matches the selector string 310 of the current event selector 203A. In some embodiments, this determination involves the event router 204 passing the selector string 310 to a method of the event target 202 that provides as output a boolean value specifying whether the event target 202 matches or satisfies the passed selector string 310. In an alternative embodiment, the event router 204 uses an interface offered by the event target 202 to interrogate the event target 202 to determine whether the event target 202 satisfies the conditions of the selector string 310. In both cases, the selector string 310 may be pre-processed or pre-compiled, for example when the event selector 203A is registered by a registrant 205, into an intermediate representation that can be efficiently used to determine whether a given event target 202 matches the selector string 310. Thus, selector string 310 refers to both a string representation and any intermediate or derived representation based on the string representation.

If the selector string 310 of the current event selector 203A matches the event target 202 of the current event 201, then the event router 204 invokes the one or more actions 206 associated of the current event selector 203A. Typically, this involves calling or invoking function(s) or method(s) of the registrant 205 that registered the current event selector 203A passing data associated with the current event 201 as argument(s) to the function(s) or method(s). However, other programmatic actions are possible and embodiments are not limited to any particular programmatic action.

At block 507, if there are more event selectors 203A in the set of registered event selectors 203A that have been yet been evaluated with respect to the current event 201, then control of process 500 returns to block 504 where a next event selector 203A from the set of registered event selectors 203A is obtained. This sub-loop is repeated until all event selectors 203A in the set of registered event selectors 203A have been evaluated with respect to the current event 201.

After all event selectors 203A in the set of registered event selectors 203A have been evaluated with respect to the current event 201, control of process 500 returns to block 502 where a next event 201 is obtained. The next event 201 is then evaluated against the set of registered event selectors 203A just described.

A Second Exemplary Query-Based Event Routing Process

Figure 6B:
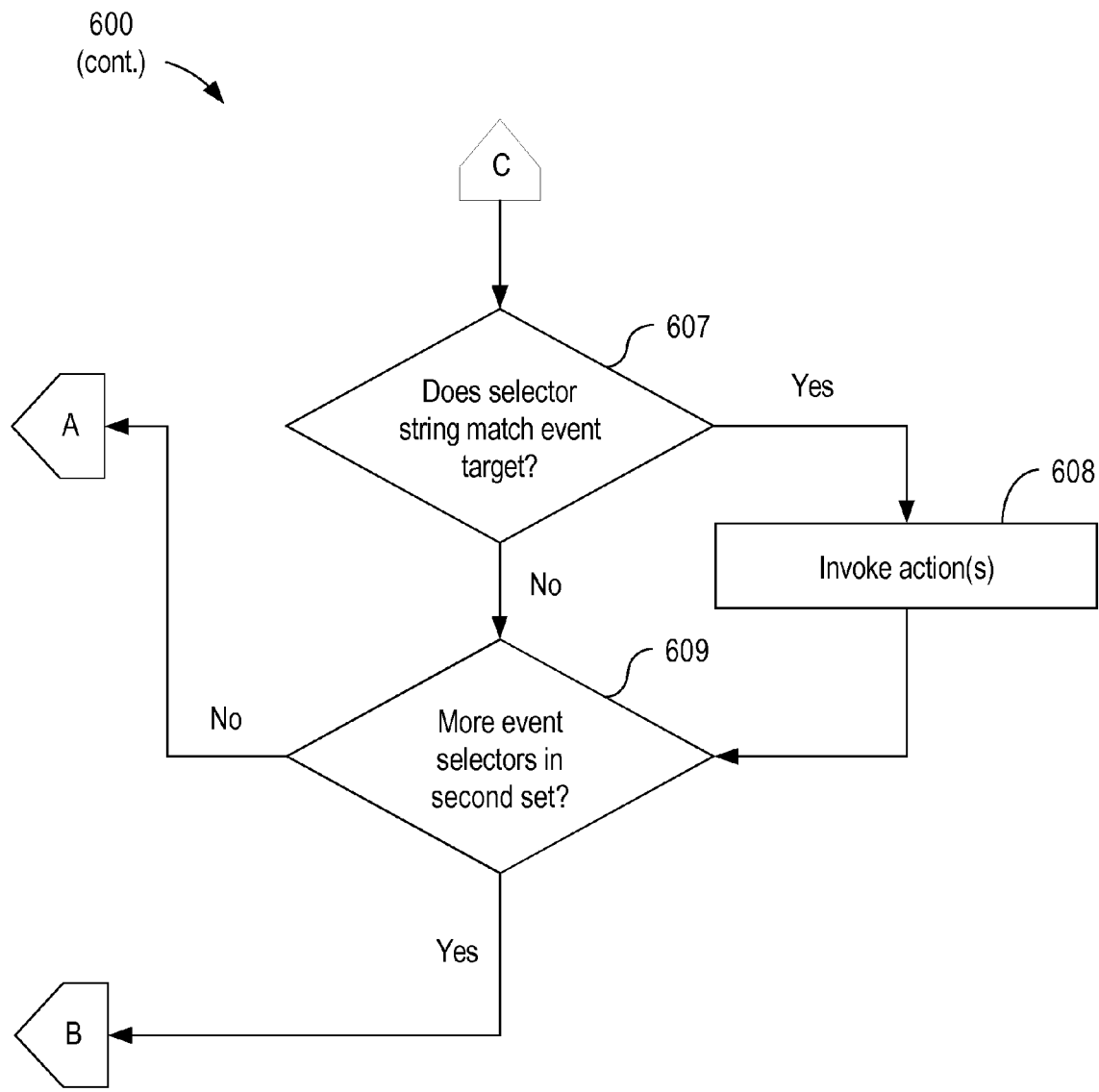

Turning now to FIG. 6, there is shown a flowchart of a second query-based event routing process 600 in which events 201 are routed to actions 206 based on selector strings 310 and event types 301 of a set of registered event selector(s) 203A. Process 600 may be performed in the context of an executing application such as application 207. Initially, a first set of event selector(s) 203B is obtained (block 601) by an event router 204 of the application 207. The event router 204 obtains the first set of event selector(s) 203B from one or more registrants 205 of the application 207. Each event selector 203B in the set includes a selector string 310, data indicating an event type 301, and data representing one or more actions 206.

The first set of registered event selectors 203B are indexed (block 602) by the event type 301 indicated by the event selectors 203B. In particular, an index (e.g., a hash table, data dictionary, tree, or other mapping data structure) is created that associates each unique event type 301 from the first set of event selectors 203B to a set of one or more event selectors 203B of the first set that indicated that event type 301. The actual index entries for a given indexed event selector 203B may contain only the selector string 310 (or an intermediate representation thereof) of the indexed event selector 203B and the data (or an intermediate representation thereof) of the indexed event selector 203B indicating the one or more actions 206. Thus, it should be understood that reference herein to "indexing" an event selector 203B may not involve indexing the actual event selector 203B itself but the selector string 310 and data indicating one or more actions 206 thereof. As an example, the keys of the index may be a unique set of event types 301 (e.g., "click", "dblclick", "mouseover", "keydown", "load", "focus", "render", etc.) and each key may map to a set of one or more selector string 310-data indicating action(s) 206 pairs where each pair was registered as part of an event selector 203B indicating that event type 301 key.

Next, the event router 204 obtains (block 603) an event 201. After obtaining the event 201, the event router 204 obtains (block 604) the type 301 of the event 201. That event type 301 of the event 201 is then used by the event router 204 to identify (block 605) a second set of event selectors 203B (or the selector strings 301 and data indicating action(s) 206 thereof) that are indexed in the index by that event type 301. For example, if the current event 201 is of type "click", then the second set of event selectors 203B consists of event selectors 203B registered under the "click" event type 301.

At block 606, an event selector 203B is obtained from the second set of event selectors 203B. The event router 204 then determines (block 607) whether the event target 202 of the current event 201 matches the selector string 310 of the current event selector 203B. This determination is the same as the one described above with respect to block 505 of process 500.

If the selector string 310 of the current event selector 203B matches the event target 202 of the current event 201, then the event router 204 invokes (block 608) the one or more actions 206 associated of the current event selector 203B. This invocation is the same as the one described above with respect to block 506 of process 500.

At block 609, if there are more event selectors 203B in the second set of registered event selectors 203B that have been yet been evaluated with respect to the current event 201, then control of process 600 returns to block 606 where a next event selector 203B from the second set of registered event selectors 203B is obtained. This sub-loop is repeated until all event selectors 203B in the second set of registered event selectors 203B have been evaluated with respect to the current event 201.

After all event selectors 203B in the second set of registered event selectors 203B have been evaluated with respect to the current event 201, control of process 600 returns to block 603 where a next event 201 is obtained and one or more of blocks 603-609 performed for the next event 201.

Sample Selector Strings

According to some embodiments, the event router 204 follows pattern matching rules to determine how to route events 201 to actions 206. These patterns, also referred to as selector strings 310, range from event target types 307 to contextual patterns. If all conditions of the pattern are true for a certain event target 202, the selector string 310 matches the event target 202.

The following table summarizes some selector string 310 syntax:

| Pattern | Meaning |
|---|---|
| | Type Selector String |
| E | Matches any event target 202 of type 307 E. |
| | Attribute Selector Strings |
| [foo] | Matches any event target 202 with the "foo" attribute 309. |
| [foo="bar"] | Matches any event target 202 whose "foo" attribute 309 has a single string value exactly equal to "bar". |
| [foo~="bar"] | Matches any event target 202 whose "foo" attribute 309 value is an array of string values, one of which is exactly equal to "bar". |

-continued

| Pattern | Meaning |
|---|---|
| [foo^="bar"] | Matches any event target 202 whose "foo" attribute 309 has a single string value that begins exactly with the string "bar". |
| [foo$="bar"] | Matches any event target 202 whose "foo" attribute 309 has a single string value that end exactly with the string "bar". |
| E[foo*="bar"] | Matches any event target 202 whose "foo" attribute 309 has a single string value that contains exactly the sub-string "bar". |
| | Structural Pseudo-Class Selector Strings |
| :root | Matches any event target 202 that has no parent 302 component. |
| :nth-child(n) | Matches any event target 202 that is the n-th child of its parent 302 component, counting from the first child. |
| :nth-last-child(n) | Matches any event target 202 that is the n-th child of its parent 302 component, count from the last child. |
| :first-child | Matches any event target 202 that is the first child of its parent 302 component. |
| :last-child | Matches any event target 202 that is the last child of its parent 302 component. |
| :empty | Matches any event target 202 that has no child components. |
| | ID Selector String |
| #myid | Matches any event target 202 that an ID 308 equal to myid. |
| | Descendant Combinator |
| E F | Matches any F event target 202 that is a descendant of an E component. |
| | Child Combinator |
| E > F | Matches any F event target 202 that is a child of an E component. |
| | Adjacent Sibling Combinator |
| E + F | Matches any F event target 202 immediately preceded by an E sibling component. |
| | General Sibling Combinator |
| E~F | Matches any F event target 202 preceded by an E sibling component. |

Selector String Syntax

In some embodiments, a selector string 310 is a chain of one or more sequences of simple selector strings separated by combinators. A sequence of simple selector strings is a chain of simple selector strings that are not separated by a combinator. A simple selector string is either a type selector string, an attribute selector string, an ID selector string, or a structural pseudo-class selector string. A sequence of simple selector strings may begin with a type selector string. If a sequence of simple selector strings begins with an attribute selector string, an ID selector string, or a structural pseudo-class selector string, then any type 307 of event target 202 or component may be selected by the sequence. Combinators are: white space, ">", "+", and "~". White space may appear between a combinator and the simple selector strings around it. A selector string 310 consisting of a single sequence of simple selector strings represents any event target 202 satisfying the requirements of the single sequence of simple selector strings. Prepending another sequence of simple selector strings and a combinator to a sequence imposes additional conditions, so that the event targets 202 of the selector string 310 are always a subset of the event targets 202 represented by the last sequence of simple selector strings.

Type Selector String

A type selector string matches the type 307 of an event target 202. Any event target 202 of the type 307 specified in the type selector string matches the type selector string. For example, the following example selector string 310 will match any event target 202 of type 307 "button":
 01: "button"

Attribute Selector Strings

An event target 202 can be selected based on its attributes 309. When a selector string 310 is used as an expression to match against an event target 202, attribute selector strings are considered to match an event target 202 or component if that event target 202 or component has an attribute 309 that matches the attribute represented by the attribute selector string. For example, the following selector string 310 matches any event target 202 having the "action" attribute 309:
 01: "[action]"

As another example, the following selector string 310 matches any event target 202 of type 307 "button" having the "action" attribute 309 with value equal to "bar":
 01: "button[action="save"]"

Structural Pseudo-Class Selector Strings

A structural pseudo-class selector string allows selection of an event target 202 or component based on information that cannot be expressed using the other simple selector strings. A structural pseudo-class selector string consists of a "colon" (:) following by the name of the structural pseudo-class and optionally a value between parentheses. For example, the following example selector string 310 will match any event target 202 that is the third ($3^{rd}$) child of its parent 302 component: ":nth-child(3)"

As another example, the following selector string 310 matches any event target 202 of type 307 "panel" that is the first child of its parent 302 component: "button:first-child"

ID Selector Strings

An event target 202 or component may be selected based on its ID 308. For example, the following selector string 310 matches any event target 202 with an ID 308 of "myid": "#myid".

As another example, the following selector string 310 matches any event target 02 of type 308 "button" with an ID 308 of "myid". "button#myid".

Descendant Combinator

At times, a developer of an application 207 may want a selector string 310 to match an event target 202 that is the descendant of another component in a tree of components of the application 207. A descendant combinator may be used in a selector string 310 to express such as relationship. A descendant combinator is whitespace that separates two sequences of simple selector strings. A selector string 310 of the form "A B" matches when an event target 202 B that is an arbitrary descendant of some ancestor component A. For example, the following example selector string 310 will match any event target 202 of type 307 "panel" that is a descendant of a component with an id 308 of "myid": "#myid panel"

As another example, the following example selector string 310 will match any event target 202 of type 307 "panel" that is a descendant of a "window" type 307 component with an id 308 of "myid": "window#myid panel".

Child Combinator

A child combinator describes a childhood relationship between an event target 202 and a component. A child combinator is made of the greater than sign ">" character and separates two sequences of simple selector strings. For example, the following example selector string 310 will match any event target 202 of type 307 "panel" that is a child of a component with an ID 308 of "myid": "#myid>panel".

As another example, the following example selector string 310 will match any event target 202 of type 307 "panel" that is a child of a "window" type 307 component with an ID 308 of "myid": "window#myid>panel".

Adjacent Sibling Combinator

An adjacent sibling combinator is made of the plus sign "+" character that separates two sequences of simple selector strings. The components represented by the two sequences share the same parent component in a tree of components of the application 207 and the component represented by the first sequence immediately precedes the component represented by the second sequence. For example, the following example selector string 310 will match any event target 202 of type 307 "button" whose immediately preceding sibling component has an ID 308 of "myid": "#myid +button"

As another example, the following example selector string 310 will match any event any event target 202 of type 307 "button" whose immediately preceding sibling component has of type 307 "panel": "panel+button".

General Sibling Combinator

A general sibling combinator is made of the tilde sign "~" character that separates two sequences of simple selector strings. The components represented by the two sequences share the same parent component in a tree of components of the application 207 and the component represented by the first sequence precedes the component represented by the second sequence. For example, the following example selector string 310 will match any event target 202 of type 307 "button" whose has a preceding sibling component with an ID 308 of "myid": "#myid~button".

As another example, the following example selector string 310 will match any event target 202 of type 307 "button" whose has a preceding sibling component of type 307 "panel" and an ID 308 of "myid": "panel#myid~button".

A Javascript Example

The following is example Javascript code of a registrant 205. This code may be executed, for example, by a Javascript interpreter of a web browser application, for example, in response to the web browser application downloading a web page (e.g., a HTML or XHTML document) that references and launches the code. Here, the registrant 205 is an instance of the "AM.controller.Users" class that extends from base class 'Ext.app.Controller'. Thus, the registrant 205 is also an instance of "Ext.app.Controller".

The registrant 205 has an init( ) function (lines 3 to 12) that, when executed, registers two event selectors 203B with an event router 204 by calling the control( ) function passing a selector string 310, an event type 301, and an action 206.

In the first event selector 203B, (lines 5 to 7) the selector string 310 (line 5) will match any event target 202 of type 307 "userlist" that is child of a component of type 307 "viewport". Line 6 specifies that the action 206 (i.e., invocation of the editUser instance method) is to be taken only if the type 301 of the event 201 is "itemdbclick". In effect, because of the first event selector 203B, the event router 204 will invoke the editUser instance method of the registrant 205 anytime the event router 204 receives an event 201 of type 301 "itemdblick" that is the target of a "userlist" type 307 component that is a child of a "viewport" type 307 component.

In the second event selector 203B (lines 8 to 10), the selector string 310 (line 8) will match any event target 202 of type 307 "button" that has an "action" attribute 309 with a string value that equals "save" and that is a descendant of a "useredit" type 307 component. Line 9 specifies that the action 206 (i.e., invocation of the updateUser instance method) is to be taken only if the type 301 of the event 201 is "click". In effect, because of the second event selector 203B, the event router 204 will invoke the updateUser instance method of the registrant 205 anytime the event router 204 receives an event 201 of type 301 "click" that is the target of a "button" type 307 component that has an "action" attribute 309 with a string value that equals "save" and that is a descendant of a "useredit" type 307 component.

It should be noted that with the first event selector 203B, if the application 207 codebase is modified to add a new "userlist" type 307 component as a child of a "viewport" type 307 component, the code of registrant 205 need not be changed or updated for the "editUser" action 206 to be invoked when an "itemdbclick" type 301 event 201 occurs on that new "userlist" component. Similarly with respect to a new "button" type 307 component that matches the selector string 310 of the second event selector 203B and is the target 202 of a "click" type 301 event 201.

```
1:      Ext.define('AM.controller.Users', {
2:          extend: 'Ext.app.Controller',
3:          init: function( ) {
4:              this.control({
5:                  'viewport > userlist': {
6:                      itemdblclick: this.editUser
7:                  },
8:                  'useredit button[action=save]': {
9:                      click: this.updateUser
10:                 }
11:             });
12:         }
13:         updateUser: function(button) {
14:             // updateUser functionality
15:         }
16:         editUser: function(grid, record) {
17:             // editUser functionality
18:         }
19:     });
```

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   obtaining a selector string and information that represents one or more actions associated with the selector string;
   wherein the selector string represents one of (a) a query only on event targets that is satisfied by any event target of a particular type specified by the selector string or (b) a query only on event targets that is satisfied by any event target having an attribute with a particular name specified by the selector string;
   in response to obtaining an event, obtaining an event target that is a subject of the event;
   in response to determining that the event target matches the selector string, using the information to cause the one or more actions associated with the selector string;
   wherein determining that the event target matches the selector string includes performing one of (a) determining a type of the event target and determining that the type of the event target is the same as the particular type specified by the selector string or (b) determining that the event target has an attribute with the particular name specified by the selector string;
   wherein the method is performed by a computing device.

2. The method of claim 1, further comprising:
   obtaining a first event type associated with the selector string;
   in response to obtaining the event, obtaining a second event type associated with the event;
   prior to determining that the event target matches the selector string, determining that the first event type associated with the selector string is the same as the second event type associated with the event.

3. The method of claim 1, wherein the event wraps a Document Object Model (DOM) event.

4. The method of claim 1, wherein the method is performed by a web browsing application executing on the computing device.

5. A method comprising:
   obtaining a selector string, first information that represents one or more actions associated with the selector string, and second information that represents a first event type associated with the selector string;
   wherein the selector string represents one of (a) a query only on event targets that is satisfied by any event target of a particular type specified by the selector string or (b) a query only on event targets that is satisfied by any event target having an attribute with a particular name specified by the selector string;
   in response to obtaining an event, obtaining an event target that is a subject of the event and obtaining third information that represents a second event type associated with the event;
   using the second information and the third information to determine whether the first event type associated with the selector string is the same as the second event type associated with the event;
   in response to determining that the first event type is the same as the second event type, using the selector string and the event target to determine whether the event target matches the selector string;
   in response to determining that the event target matches the selector string, using the first information to cause the one or more actions associated with the selector string;
   wherein determining that the event target matches the selector string includes performing one of (a) determining a type of the event target and determining that the type of the event target is the same as the particular type specified by the selector string or (b) determining that the event target has an attribute with the particular name specified by the selector string;
   wherein the method is performed by a computing device.

6. One or more non-transitory computer-readable media comprising one or more stored sequences of instructions which, when executed by one or more processors, cause performance of a method comprising:
   obtaining a selector string and information that represents one or more actions associated with the selector string;
   wherein the selector string represents one of (a) a query only on event targets that is satisfied by any event target of a particular type specified by the selector string or (b) a query only on event targets that is satisfied by any event target having an attribute with a particular name specified by the selector string;
   in response to obtaining an event, obtaining an event target that is a subject of the event;
   in response to determining that the event target matches the selector string, using the information to cause the one or more actions associated with the selector string;
   wherein determining that the event target matches the selector string includes performing one of (a) determining a type of the event target and determining that the type of the event target is the same as the particular type specified by the selector string or (b) determining that the event target has an attribute with the particular name specified by the selector string.

7. The one or more non-transitory computer-readable media of claim 6, the method further comprising:
   obtaining a first event type associated with the selector string;
   in response to obtaining the event, obtaining a second event type associated with the event;
   prior to determining that the event target matches the selector string, determining that the first event type associated with the selector string is the same as the second event type associated with the event.

8. The one or more non-transitory computer-readable media of claim 6, wherein the event wraps a Document Object Model (DOM) event.

9. The one or more non-transitory computer-readable media of claim 6, wherein the one or more stored sequences of instructions are Javascript instructions.

10. One or more non-transitory computer-readable media comprising one or more stored sequences of instructions which, when executed by one or more processors, cause performance of a method comprising:
    obtaining a selector string, first information that represents one or more actions associated with the selector string, and second information that represents a first event type associated with the selector string;
    wherein the selector string represents one of (a) a query only on event targets that is satisfied by any event target of a particular type specified by the selector string or (b) a query only on event targets that is satisfied by any event target having an attribute with a particular name specified by the selector string;

in response to obtaining an event, obtaining an event target that is a subject of the event and obtaining third information that represents a second event type associated with the event;

using the second information and the third information to determine whether the first event type associated with the selector string is the same as the second event type associated with the event;

in response to determining that the first event type is the same as the second event type, using the selector string and the event target to determine whether the event target matches the selector string;

in response to determining that the event target matches the selector string, using the first information to cause the one or more actions associated with the selector string;

wherein determining that the event target matches the selector string includes performing one of (a) determining a type of the event target and determining that the type of the event target is the same as the particular type specified by the selector string or (b) determining that the event target has an attribute with the particular name specified by the selector string.

\* \* \* \* \*